United States Patent

[11] 3,540,686

| [72] | Inventor | Marcel Charel Firmin Jean Bryse Emmasingel, Eindhoven, Netherlands |
|---|---|---|
| [21] | Appl. No. | 757,571 |
| [22] | Filed | Sept. 5, 1968 |
| [45] | Patented | Nov. 17, 1970 |
| [73] | Assignee | U.S. Philips Corporation New York, New York a corporation of Delaware. by mesne assignments |
| [32] | Priority | Sept. 25, 1967 |
| [33] | | Netherlands |
| [31] | | No. 67,13060 |

[54] SUPPORT BRACKET
5 Claims, 2 Drawing Figs.

[52] U.S. Cl............................................... 248/278, 211/99; 248/309
[51] Int. Cl............................................... A47f 7/00
[50] Field of Search........................................ 248/309, 278, 279, 282, 285, 289, 300; 211/97, 99, 116; 224/42—45

[56] References Cited
UNITED STATES PATENTS

| 1,174,218 | 3/1916 | Young.......................... | 248/279 |
| 2,829,920 | 4/1958 | Cohen.......................... | 248/279X |
| 3,214,124 | 10/1965 | Berardinelli.................. | 248/278 |

Primary Examiner—Roy D. Frazier
Assistant Examiner—J. Franklin Foss
Attorney—Frank R. Trifari ABSTRACT: A support bracket for suspending a magnetic tape magazine storage cabinet from the dashboard of an automobile. The storage cabinet is affixed to a plate element which has a plurality of recessed portions therein adapted for interlocking engagement with tags protruding from a bipartite bracket assembly bolted to and supporting the plate for rotational adjustment with respect to the bracket. Further translatory adjustment is achieved by means of a slotted bolt hole provided in the bracket.

Patented Nov. 17, 1970 3,540,686

INVENTOR.
MARCEL C. F. J. BRYSE
BY
AGENT

SUPPORT BRACKET

The invention relates to a suspension device for securing an appliance to a wall and in particular to a support bracket for suspending a magnetic tape storage rack or use on the dashboard of an automobile.

The location of a storage rack on top of or otherwise attached to a dashboard presents the problem of mounting same within a limited space, also the mutually different shapes and dimensions of the dashboards of the many types of automobiles cause further difficulties.

An object of the invention is to mitigate these difficulties. The invention is characterized by a suspension bracket comprising two bracket parts which are pivotable relative to each other in a first plane and can be fixed in a plurality of positions. A plate-like element is detachably connected to one of the bracket parts, and positioning means are present which with the aid of the plate-like element and the bracket part connected thereto, can be relatively placed in one of a plurality or mutually rotated angular positions and/or shifted positions which are located in a second plane.

The suspension device according to the invention can be secured to a dashboard of an automobile, a storage rack can be suspended at the other end. This provides a universal solution for securing the rack to the dashboard since the rack is adjustable relative to the dashboard in more than one dimension, namely according to the pivotal movement of the suspension bracket in the first plane and in angular positions located in the second plane and/or shifted positions located in said second plane.

A suitable embodiment of the invention is characterized by a first type of positioning means consisting of a plurality of elongated recesses located in one plane and directed along lines intersecting at a common centre, and a second type of positioning means which are placed in one or more of said recesses, the plate-like element of one of the two types of positioning means and the bracket part connected thereto being provided with the other type of means.

In this embodiment the angular positions are obtained by placing the second type of positioning means in the recesses and the shifted positions by relative displacement of these means and recesses so that the storage rack can be spatially adjusted relative to the dashboard.

According to the invention the bracket part connected to the plate-like element preferably has a flat portion in which a slotted hole is provided having substantially angularly bent tags at either end, while the plate-like element includes the elongated recesses, a threaded bore being present at the centre of the recess pattern in which bore a threaded bolt inserted through the slotted hole of the bracket part is screwed. In this case the plate-like element can be connected, for example, glued to one of the sides of an appliance to be suspended such as a storage rack or case. In a preferred embodiment according to the invention the plate-like element forms at least part of one of the sides of the appliance. When using synthetic material one side of the appliance may then be manufactured for example, by extrusion moulding, together with the plate-like element in one operation.

In order that the invention may be readily carried into effect, it will now be described in detail, by way of example, with reference to the accompanying diagrammatic drawing, in which.

Figure 1:
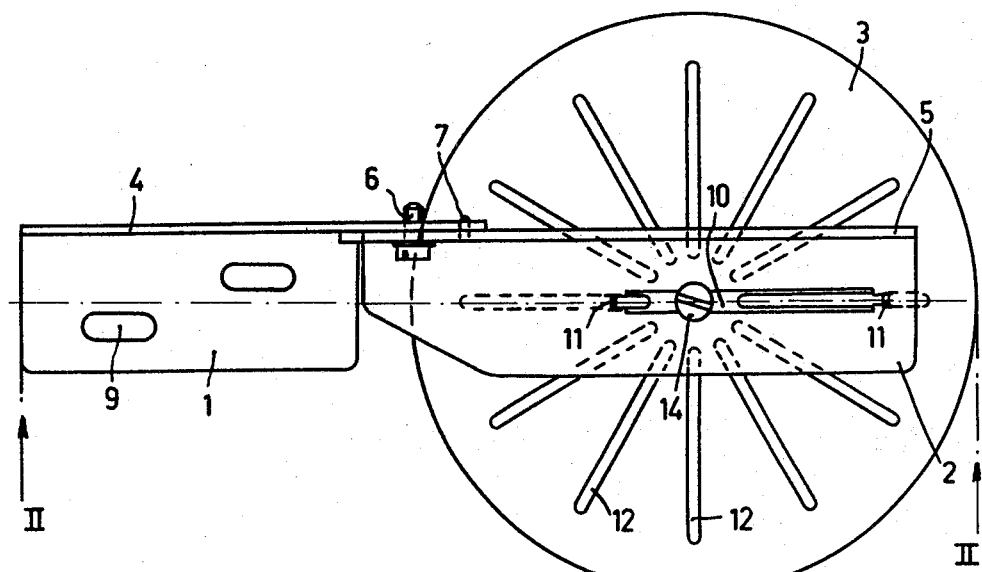
FIG. 1 is a plan view of a device according to the invention.
Figure 2:
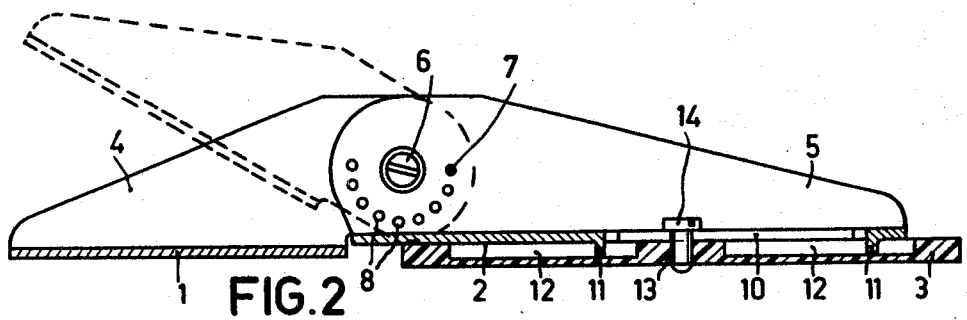
FIG. 2 is a section of said device taken on the line II–II of FIG. 1.

According to the drawing the suspension device comprises a bipartite suspension bracket 1, 2 and a plate-like element 3. The bracket parts 1, 2 have the form of angularly bent strips with flanged portions 4, 5 which are pivotable relative to a threaded bolt 6 inserted in these flanges—perpendicularly to the plane of the drawing of FIG. 1—and can be fixed in a plurality of positions by means of the bolt 6. For adjustment of these positions a pin 7 is secured in the flanged portion 4 and a plurality of holes 8 concentrically located around the pivot bolt 6 is provided in the flanged portion 5, it being possible to turn the bracket portions 1, 2 relative to each other after unscrewing the bolt 6, place them in a desired position by placing the pin 7 in one of the holes 8 and subsequently fix them in this position with the aid of the bolt 6. The bracket parts are shown in a stretched position in the drawing, the bracket part 1 being shown in FIG. 2 in a second modified position shown in broken lines.

It is noted that the embodiment shown of the pivot bolt 6 and coacting pin and holes 7 and 8, respectively, is not essential to the invention. The scope of the invention comprises any construction in which the bracket parts are pivotable and can be fixed in a plurality of positions.

One or more apertures 9 are provided in the bracket part 1 with the aid of which apertures the bracket can be secured to a wall not further shown, for example, the dashboard of an automobile, the plate-like element 3 then being connected to an appliance to be suspended and not further shown, for example, a magazine storage rack. The bracket part 2 is provided with a slotted hole 10 having substantially angularly bent tags 11 at either end, the purpose of which will be apparent hereinafter. A plurality of elongated recesses 12 is provided in the plate-like element 3 which are directed along lines intersecting at a common centre, and in the preferred embodiment, ends at some distance from the centre and the periphery of the plate. In said centre the plate-like element 3 is provided with a threaded bore 13. The recesses 12 and the tags 11 form positioning means with the aid of which the bracket part 2 and the plate-like element 3 can be positioned in one of a plurality of relatively rotated angular positions by placing the tags in two aligned recesses and can be placed in relatively shifted positions by displacing the tags in the two chosen recesses, after which the components thus positioned are secured to each other with the aid of a central threaded bolt 14.

The bracket parts 1, 2 may be manufactured of metal while the plate-like element 3 is preferably extrusion moulded of a synthetic material. In this case the element 3 may be connected to one side of an appliance or be suspended, as for example, by adhesively affixing same thereto, or—in case the appliance is also made of synthetic material—extrusion moulded together with a wall thereof in one operation.

The invention is not limited to the embodiment shown in the drawing and described hereinbefore. If desired, the bracket part 2 could have only one tag instead of two tags 11 since the mutual positions of bracket and plate could readily be determined by one tag together with the central bolt 14.

I claim:

1. A support bracket assembly for adjustably securing a magnetic tape magazine storage cabinet to an automobile dashboard, said assembly providing for simultaneous rotational and translational adjustment of the cabinet and comprising a first bracket member adapted for attachment to the dashboard, a second bracket member pivotally attached to the first bracket member, means for adjustably positioning the second bracket member with respect to the first bracket member, a plate member for securing the storage cabinet to the second bracket member, said plate member defining a plurality of spaced recess portions, fastening means for affixing the plate member to the second bracket member, tag means projecting from the second bracket member and adapted for engagement into the recess portions of the plate member for rotational adjustment of the plate member with respect to the second bracket member, and said second bracket member further defining a slotted opening which in cooperation with the fastening means provides for the translational adjustment of the plate member with respect to the second bracket member.

2. A support bracket assembly as claimed in claim 1 wherein the plate member defines therein a plurality of recesses positioned radially around a common center.

3. A support bracket assembly as claimed in claim 2 wherein the common center is an opening within the plate for accommodating the fastening means.

4. A support bracket assembly as claimed in claim 3 wherein two tag members project outwardly from the second bracket member at opposite ends of the slotted opening for engagement within an aligned recess in the plate member to thereby fix the rotational positioning of the plate member with respect to the second bracket member.

5. A support bracket assembly for adjustably securing a magnetic tape magazine storage cabinet to an automobile dashboard, said assembly providing for simultaneous rotational and translational adjustment of the cabinet and comprises a bipartite bracket assembly for attachment at one end thereof to the dashboard, a slotted opening being defined in the opposed end of the bracket assembly, a plate member for securing the cabinet to the bracket, said plate member defining a plurality of elongated recesses spaced radially around a common center, bolt means positioned within the slotted bracket opening and cooperating therewith for effectuating translational positioning and for adjustably securing the plate member to the bracket assembly, and tag means projecting outwardly from the bracket assembly for engagement within the plate recesses for rotational positioning of the plate member and attached cabinet.